US012678826B2

United States Patent
(12) United States Patent
Park et al.

(10) Patent No.: US 12,678,826 B2
(45) Date of Patent: Jul. 14, 2026

(54) PIEZO ACTUATOR MODULE FOR BROADBAND-FREQUENCY HAPTIC FEEDBACK

(71) Applicant: INDUSTRY-ACADEMIC COOPERATION FOUNDATION, YONSEI UNIVERSITY, Seoul (KR)

(72) Inventors: No-Cheol Park, Seoul (KR); Whee Jae Kim, Seongnam-si (KR); Young Jin Park, Siheung-si (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 904 days.

(21) Appl. No.: 18/058,413

(22) Filed: Nov. 23, 2022

(65) Prior Publication Data

US 2023/0158545 A1 May 25, 2023

(30) Foreign Application Priority Data

Nov. 25, 2021 (KR) ........................ 10-2021-0164621

(51) Int. Cl.
*B06B 1/06* (2006.01)
*G08B 6/00* (2006.01)

(52) U.S. Cl.
CPC .............. *B06B 1/0618* (2013.01); *G08B 6/00* (2013.01)

(58) Field of Classification Search
CPC ........ B06B 1/0618; G08B 6/00; H02N 2/043; H02N 2/026; G06F 3/016; H10N 30/02; H10N 30/2047
USPC .................................................. 310/322, 334
See application file for complete search history.

(56) References Cited

U.S. PATENT DOCUMENTS

2013/0100046 A1* 4/2013 Chuang .................. G06F 3/016
345/173

* cited by examiner

*Primary Examiner* — Jorge L Salazar, Jr.

(57) ABSTRACT

A piezo actuator module capable of haptic feedback in a wide frequency range comprises an actuator layer including a piezo actuator having one surface coupled to an object to be excited and vibrating by an electric signal and an inertial mass layer having a certain mass and coupled to the other surface of the actuator layer. The inertial mass layer supports the other surface of the actuator layer when the piezo actuator vibrates.

10 Claims, 6 Drawing Sheets

PIEZO ACTUATOR MODULE FOR BROADBAND-FREQUENCY HAPTIC FEEDBACK

CROSS-REFERENCE TO RELATED APPLICATIONS

This application claims priority under 35 U.S.C. § 119(a) to Korean Patent Application No. 10-2021-0164621, filed on Nov. 25, 2021, in the Korean Intellectual Property Office, the disclosure of which is incorporated herein in its entirety by reference.

BACKGROUND

1. Technical Field

The present disclosure relates to a piezo actuator for haptic feedback, more particularly to a piezo actuator module having excellent vibration force in a low frequency region while applying a piezo-type actuator.

2. Description of the Related Art

Haptic is a technology that uses tactile sensation to control a device, and when touching or handling an electronic device, it gives the same feeling as actually touching a specific object. Recently, haptic technology is being used not only in touch phones but also in various types of electronic devices such as stylus pens for touch screens and various game devices, and the fact that analog sensibility is applied to digital devices is getting a good response from consumers.

The core of haptic technology is vibration, and various types of tactile sensations can be created by changing the amplitude, frequency, and delivery time of vibration. Haptic feedback is a technology that delivers virtual tactile sensations by applying these stimuli to the human skin. For example, a vibration actuator is provided below the touch screen of a touch phone, and when the touch screen is touched, the vibration actuator operates, and the tactile sensation of the generated vibration stimulus is transmitted to the user through the skin.

A haptic device using haptics is ideally capable of reproducing dynamic characteristics (vibration, tactile sensation, operation sound, etc. transmitted to the finger when pressing the button) with the same responsiveness as touching a real object (actual button) when a person touches a virtual object (for example, a button sign on a window screen). To improve the performance of these haptic devices, mechatronics equipment or the like using motors and link mechanisms has been used so far.

Meanwhile, the haptic feedback is divided into low-frequency haptic feedback that vibrates in the finger's tactile recognition frequency range (100 to 500 Hz) and ultrasonic haptic feedback that vibrates in the frequency range (20 kHz or higher) above the audible frequency. The low-frequency haptic feedback is implemented using a solenoid-type coil actuator, and the ultrasonic haptic feedback is implemented through a piezo-type actuator.

The solenoid actuator used for low-frequency haptic feedback has the disadvantage of being large and slow in response. On the other hand, the piezo-type actuator used for ultrasonic haptic feedback has a high response speed and a small size, so the space efficiency is high, but there is a disadvantage in that it is impossible to vibrate at a low frequency that the finger can perceive.

Accordingly, it is required to develop a technology for realizing low-frequency excitation that can be perceived by a finger using a piezo-type actuator with a fast response speed and a small size.

SUMMARY

The present disclosure has been made to solve the above problems. An object of the present disclosure is to provide a piezo actuator capable of haptic feedback in a wide frequency range with improved low-frequency excitation ability of piezo actuator, by providing an inertial mass on the opposite side of the object to be excited by the piezo actuator, and using the supporting force of the inertial mass when excited by the piezo actuator.

A piezo actuator module capable of haptic feedback in a wide frequency range according to an embodiment of the present disclosure comprises: an actuator layer including a piezo actuator having one surface coupled to an object to be excited and vibrating by an electric signal; and an inertial mass layer having a certain mass and coupled to the other surface of the actuator layer, in which the inertial mass layer supports the other surface of the actuator layer when the piezo actuator vibrates, and improves excitation performance of the piezo actuator in a low frequency region of 500 Hz or less.

In addition, the piezo actuator module is characterized in that the excitation performance in a specific region among the low frequency region is improved by varying the mass of the inertial mass layer.

In addition, the piezo actuator module may further include: an intermediate layer provided between the object to be excited and the actuator layer or between the actuator layer and the inertial mass layer, and having a certain stiffness or a certain elastic force.

In addition, the intermediate layer may include an adhesive component to improve adhesion between the object to be excited and the actuator layer or between the actuator layer and the inertial mass layer.

In addition, the piezo actuator module may further include: a housing having an enclosure shape with a hollow inside to accommodate the actuator layer, the inertial mass layer and the intermediate layer, that is open on one side and closed on the other side.

In addition, when the intermediate layer is provided between the actuator layer and the inertial mass layer, the piezo actuator module may further include: an adhesive layer that seals the open surface of the housing, has a certain elastic force, and includes an adhesive component.

A piezo actuator module capable of haptic feedback in a wide frequency range according to another embodiment of the present disclosure comprises: an actuator layer including a piezo actuator having one surface coupled to an object to be excited and vibrating by an electric signal; and an inertial mass housing having an enclosure shape with a hollow inside to accommodate the actuator layer, that is open on one side and closed on the other side, in which the inertial mass housing includes a sealing surface having a certain mass and in contact with the other surface of the actuator layer, and a side surface extending to one side along the circumference of the sealing surface, and the inertial mass housing supports the other side of the actuator layer when the piezo actuator vibrates, thereby improving excitation performance of the piezo actuator in a low frequency region of 500 Hz or less.

In addition, the piezo actuator module is characterized in that the excitation performance in a specific region among the low frequency region is improved by varying the mass of the sealing surface.

In addition, the piezo actuator module may further include: an intermediate layer provided between the object to be excited and the actuator layer or between the actuator layer and the inertial mass housing, and having a certain stiffness or a certain elastic force.

In addition, the piezo actuator module is characterized in that the excitation performance in a specific region among the low-frequency region is improved by selectively applying a material having a different stiffness or elastic force to the intermediate layer.

In addition, when the intermediate layer is provided between the actuator layer and the inertial mass housing, the piezo actuator module may further include: an adhesive layer that seals the open surface of the housing, has a certain elastic force, and includes an adhesive component.

The piezo actuator capable of haptic feedback in a wide frequency range of the present disclosure according to the above configuration basically has a fast reaction speed and a small size, so it has an effect of high space efficiency, but also has an effect that can be applied to low frequency haptic feedback by securing low frequency excitation performance.

In addition, there is an effect that can vary the resonance frequency of the actuator by changing the inertial mass.

In addition, while securing low-frequency excitation performance, the deterioration in high-frequency excitation performance is negligible, so there is an effect that can be applied to haptic feedback of a wide range of frequencies.

DETAILED DESCRIPTION

Hereinafter, an embodiment of the present disclosure as described above will be described in detail with reference to the drawings.

Example 1 (Basic Type)

Figure 1:
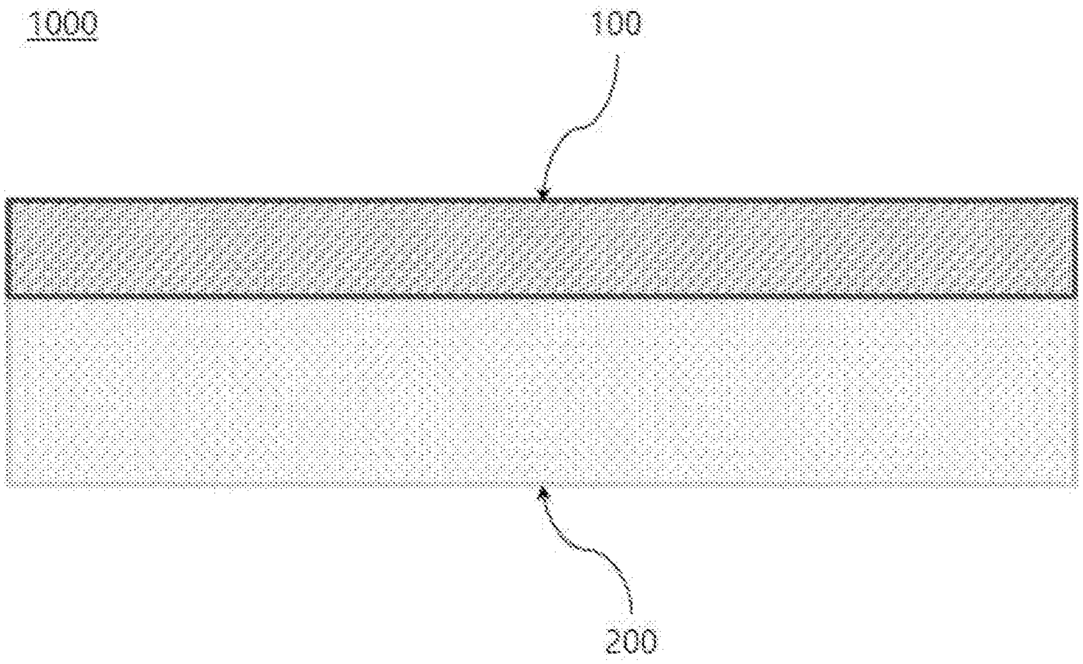
FIG. 1 shows a schematic cross-sectional view of an actuator according to an embodiment of the present disclosure.

FIG. 1 shows a schematic cross-sectional view of a piezo actuator module 1000 according to an embodiment of the present disclosure. As shown, the piezo actuator module 1000 is configured to include an actuator layer 100 having one surface in contact with or coupled to an object to be excited and an inertial mass layer 200 provided to come into contact with the other surface of the actuator layer 100. Hereinafter, the one side is defined as the upper side on the drawing, and the other side is defined as the lower side on the drawing.

The actuator layer 100 may be formed of a piezo-type actuator. The piezo-type actuator may include a piezo electric ceramic vibrator, and when a pulse width modulation (PWM) signal is applied to the piezo electric ceramic vibrator, the vibrator vibrates while repeating expansion and contraction. At this time, the piezo-type actuator has excellent excitation performance in a high-frequency region of 20 kHz or more, but has a disadvantage that the excitation performance is insufficient in the low-frequency range of 100 to 500 Hz that humans can perceive with their tactile sense. Therefore, the piezo actuator module 1000 according to an embodiment of the present disclosure has the following characteristics.

An inertial mass layer 200 having a certain mass is coupled to the other surface of the actuator layer 100. Although the piezo type actuator layer 100 has poor excitation performance in the low frequency region when in contact with an excitation target, it is configured to improve excitation performance (vibration force) in a low frequency region applied to the excitation target by supporting the vibration of the piezo actuator on the other surface of the actuator layer 100 through the inertial mass layer 200.

That is, when an excitation target is provided on one surface of the actuator layer 100, when the vibration of the actuator layer 100 is transmitted to the inertial mass layer 200 disposed on one surface of the actuator layer 100, a reaction force according to the support of the inertial mass layer 200 is transmitted to the actuator layer 100, and by the reaction force, the force of the actuator layer 100 to push the excitation target increases, thereby improving excitation performance in a low frequency region. Accordingly, the actuator layer 100 is configured to transmit excitation in a low-frequency region that can be perceived by the human tactile sense, to the excitation target.

At this time, since a small acceleration is obtained when the mass of the inertial mass layer 200 is large, and a large acceleration is obtained when the mass is small, it is configured to derive optimized excitation performance in a desired frequency range by adjusting the mass of the inertial mass layer 200 as needed.

Example 2 (Intermediate Layer Provided Type)

Figure 2:
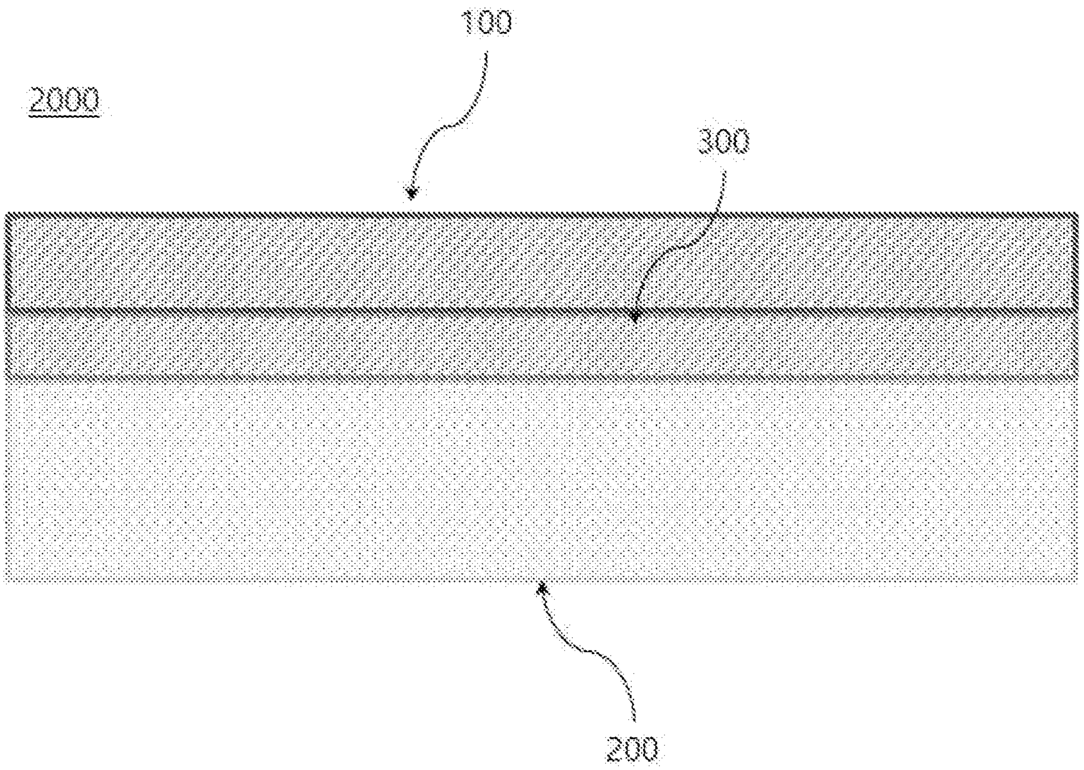
FIG. 2 shows a schematic cross-sectional view of an actuator according to an embodiment of the present disclosure.

FIG. 2 shows a schematic cross-sectional view of a piezo actuator module 2000 according to an embodiment of the present disclosure. As shown, the piezo actuator module 2000 is configured to include an actuator layer 100 and an inertial mass layer 200 provided on the other surface of the actuator layer 100, wherein an intermediate layer 300 may be further provided between the actuator layer 100 and the inertial mass layer 200.

The intermediate layer 300 is provided between the actuator layer 100 and the inertial mass layer 200 to serve to mediate them. The intermediate layer 300 is configured to have a certain stiffness or elastic force to efficiently transfer the excitation of the actuator layer 100 to the inertial mass layer 200, and to efficiently transfer the reaction force of the inertial mass layer 200 to the actuator layer 100. In addition, when the physical properties of the intermediate layer 300 are changed through a material change of the intermediate layer 300, the resonant frequency of the intermediate layer 300 is changed, so that it is possible to control the excitation ability to have excellent excitation performance in a specific region when the actuator layer 100 is excited in a low frequency region. To this end, the intermediate layer 300 may be made of a material having suitable stiffness or elasticity in order to improve excitation performance in a specific region.

In addition, the intermediate layer 300 includes an adhesive component so that the inertial mass layer 200 can be firmly adhered to the other surface of the intermediate layer 300, and that the actuator layer 100 can be firmly adhered to one surface of the intermediate layer 300. In this way, it is configured to minimize loss of force that may occur during excitation or reaction force transmission.

Example 3 (Housing Provided Type)

Figure 3:
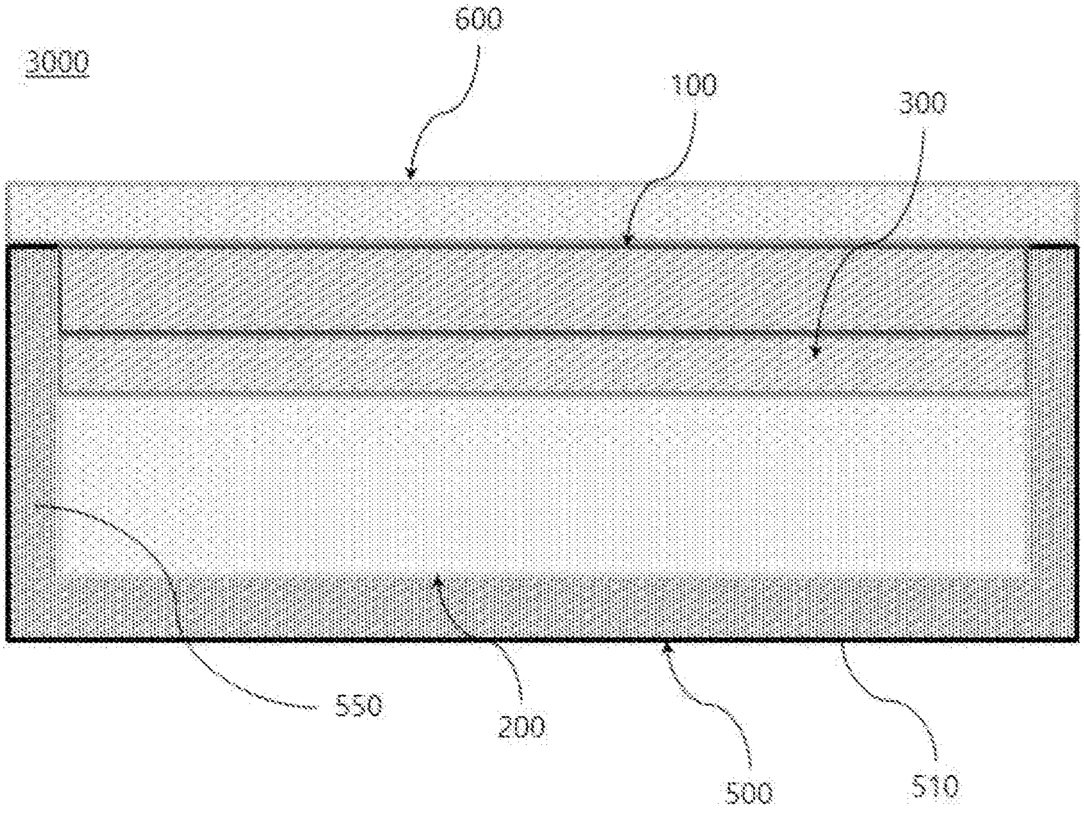
FIG. 3 shows a schematic cross-sectional view of an actuator according to an embodiment of the present disclosure.

FIG. 3 shows a schematic cross-sectional view of a piezo actuator module 3000 according to an embodiment of the present disclosure. As shown, the piezo actuator module 3000 includes an actuator layer 100, an inertial mass layer 200 provided on the other side of the actuator layer 100, and an intermediate layer 300 provided between the actuator layer 100 and the inertial mass layer 200. Additionally, the piezo actuator module 3000 further includes a housing 500 in which the actuator layer 100, the inertial mass layer 200, and the intermediate layer 300 are accommodated, and an adhesive layer 600 for bonding with an excitation target.

The housing 500 may have an enclosure shape with a hollow inside, that is open on one side and closed on the other side. That is, it is configured to include a sealing surface 510 and a side surface 550 extending to one side along the circumference of the sealing surface 510. Inside the housing 500, the inertial mass layer 200, the intermediate layer 300, and the actuator layer 100 are sequentially accommodated, and the open surface of the housing 500 may be sealed through the adhesive layer 600. The adhesive layer 600 may be made of the same material as the intermediate layer 300, or the content of the adhesive component may be further increased in order to improve bonding strength with an excitation target. The housing 500 may be configured such that the side height corresponds to the stacking height of the actuator layer 100, so that one side surface of the side surface 550 is coupled along the circumference of the other surface of the adhesive layer 600.

Example 4 (Inertial Mass Housing Type)

Figure 4:
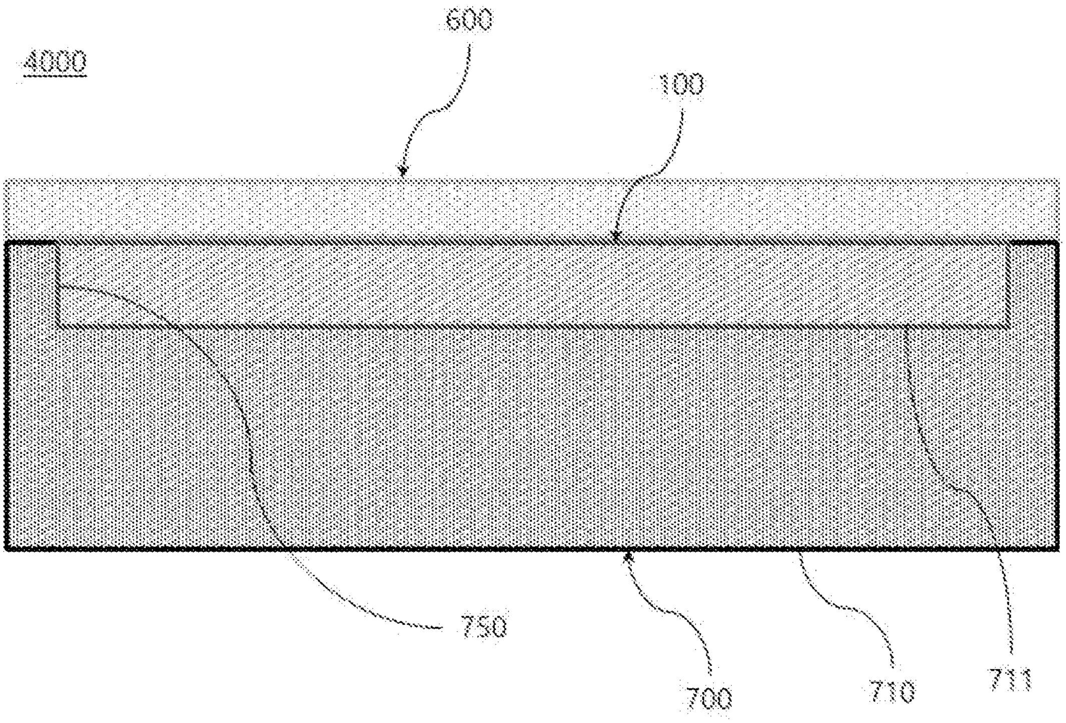
FIG. 4 shows a schematic cross-sectional view of an actuator according to an embodiment of the present disclosure.

FIG. 4 shows a schematic cross-sectional view of a piezo actuator module 4000 according to an embodiment of the present disclosure. As shown, the piezo actuator module 4000 is configured to include an inertial mass housing 700 in which an actuator layer 100 is accommodated, wherein the inertial mass housing 700 is provided to come into contact with the other surface of the actuator layer 100. As described in the name, this embodiment is characterized by simplifying the system by configuring the housing 700 to serve as an inertial mass in parallel.

The inertial mass housing 700 may have an enclosure shape with a hollow inside, that is open on one side and closed on the other side. That is, it is configured to include a sealing surface 710 and a side surface 750 extending to one side along the circumference of the sealing surface 710. The actuator layer 100 is accommodated inside the inertial mass housing 700, wherein the other surface of the actuator layer 100 is configured to come into contact with the bottom surface 711 of one side of the sealing surface 710 of the inertial mass housing 700. Here, the sealing surface 710 of the inertial mass housing 700 has a certain mass to perform the role of the inertial mass layer 200 described above. To this end, the sealing surface 710 may be formed to be thick in the height direction, and for example, may be configured to have a thickness sufficient to obtain a desired reaction force when the actuator layer 100 is excited. That is, since a small acceleration is obtained when the thickness of the sealing surface 710 is thick, and a large acceleration is obtained when the thickness is thin, it is configured to derive optimized excitation performance in a desired frequency range by adjusting the thickness of the sealing surface 710 as needed.

The open surface of the inertial mass housing 700 may be sealed through the adhesive layer 600.

Example 5 (Inertial Mass Housing and Intermediate Layer Provided Type)

Figure 5:
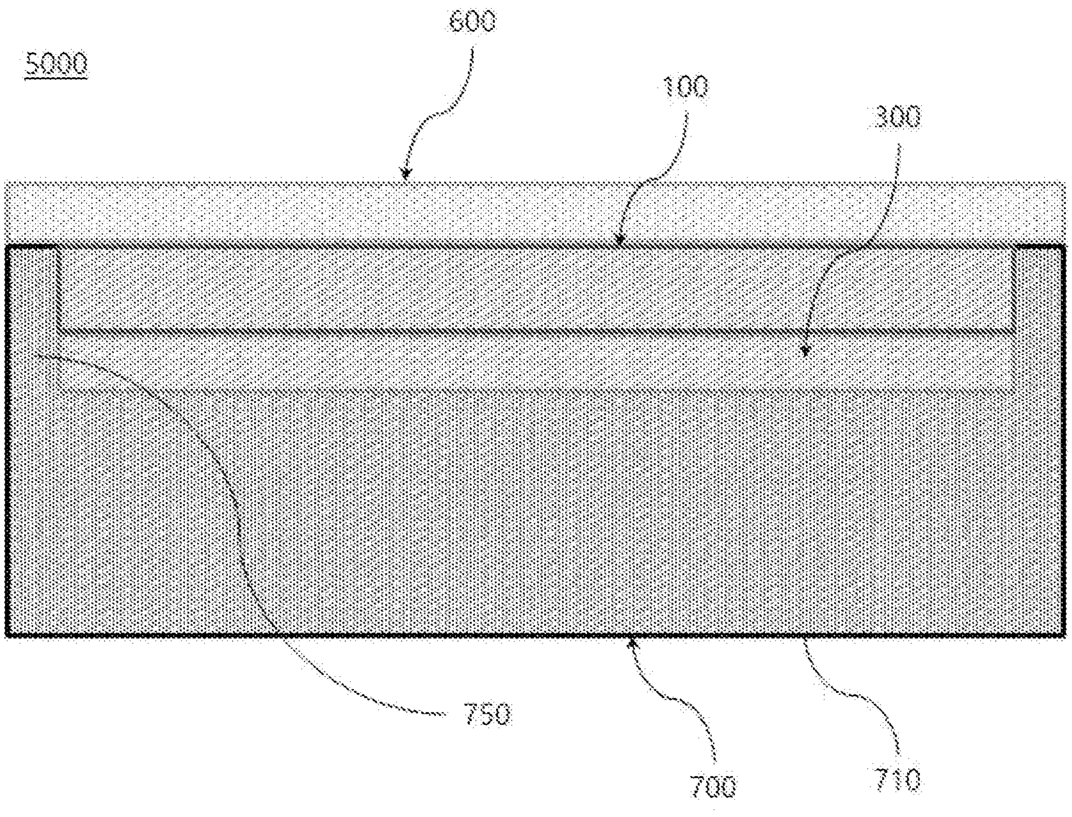
FIG. 5 shows a schematic cross-sectional view of an actuator according to an embodiment of the present disclosure.

FIG. 5 shows a schematic cross-sectional view of a piezo actuator module 5000 according to an embodiment of the present disclosure. As shown, the piezo actuator module 5000 is configured to include an actuator layer 100 and an inertial mass housing 700 provided on the other surface of the actuator layer 100, wherein an intermediate layer 300 may be further provided between the actuator layer 100 and the inertial mass housing 700.

The intermediate layer 300 is provided between the actuator layer 100 and the inertial mass housing 700 to serve to mediate them. The intermediate layer 300 is configured to have a certain stiffness or elastic force to efficiently transfer the excitation of the actuator layer 100 to the inertial mass housing 700, and to efficiently transfer the reaction force of the inertial mass housing 700 to the actuator layer 100. That is, when the physical properties of the intermediate layer 300 are changed through a material change of the intermediate layer 300, the resonant frequency of the intermediate layer 300 is changed, so that the low frequency excitation capability of the actuator layer 100 can be controlled. To this end, the intermediate layer 300 may be made of a material having suitable stiffness or elasticity in order to improve excitation performance in a specific region.

In addition, the intermediate layer 300 includes an adhesive component so that the inertial mass housing 700 can be firmly adhered to the other surface of the intermediate layer 300, and that the actuator layer 100 can be firmly adhered to one surface of the intermediate layer 300. In this way, it is configured to minimize loss of force that may occur during excitation or reaction force transmission.

Figure 6:
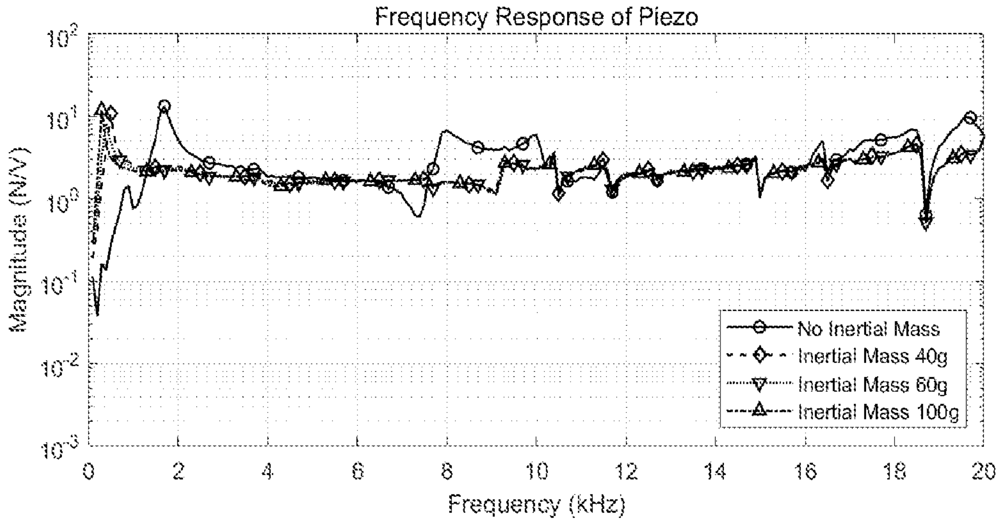
FIG. 6 shows a graph showing the magnitude of vibration according to the frequency band depending on the presence or absence of an inertial mass and when the mass changes.

FIG. 6 shows a graph showing the magnitude of vibration according to the frequency band depending on the presence or absence of an inertial mass and when the mass changes.

As shown, in the case of a normal piezo actuator module that does not include an inertial mass, the vibration performance in a low frequency region (100 to 500 Hz) is low, so it is impossible to perceive through the tactile sense. However, it can be seen that when an inertial mass is included, since vibration performance in a low-frequency region (100 to 500 Hz) can be secured, the implementation of low-frequency haptic feedback is possible.

In addition, since the vibration performance of a conventional piezo actuator module and the vibration performance of a piezo actuator module including an inertial mass do not differ significantly in a high frequency region (20 kHz or higher), it can be applied to haptic feedback of a wide range of frequencies.

In addition, when the mass of the inertial mass is varied, vibration performance optimized in a specific range can be exhibited in the low frequency range (100 to 500 Hz), so the optimum vibration performance in a specific range can be realized through varying the inertial mass.

The technical spirit of the present disclosure should not be interpreted as being limited to the above-described embodiments. It goes without saying that the scope of application is varied, and various modifications can be made at the level of those skilled in the art without departing from the gist of the present disclosure as claimed in the claims. Therefore, such improvements and modifications fall within the protection scope of the present invention as long as they are apparent to those skilled in the art.

What is claimed is:

1. A piezo actuator module capable of haptic feedback in a wide frequency range comprising:

an actuator layer including a piezo actuator having one surface coupled to an object to be excited and vibrating by an electric signal;

an inertial mass layer having a certain mass and coupled to the other surface of the actuator layer, wherein the inertial mass layer supports the other surface of the actuator layer when the piezo actuator vibrates, and an intermediate layer provided between the object to be excited and the actuator layer or between the actuator layer and the inertial mass layer, and having a certain stiffness or a certain elastic force.

2. The piezo actuator module capable of haptic feedback in the wide frequency range according to claim 1, wherein in the piezo actuator module, mass of the inertial mass layer is selected to optimize excitation performance in a low frequency region.

3. The piezo actuator module capable of haptic feedback in the wide frequency range according to claim 1, wherein the intermediate layer includes an adhesive component to improve adhesion between the object to be excited and the actuator layer or between the actuator layer and the inertial mass layer.

4. The piezo actuator module capable of haptic feedback in the wide frequency range according to claim 1, wherein the piezo actuator module further includes:

a housing having an enclosure shape with a hollow inside to accommodate the actuator layer, the inertial mass layer and the intermediate layer, that is open on one side and closed on the other side.

5. The piezo actuator module capable of haptic feedback in the wide frequency range according to claim 4, wherein, when the intermediate layer is provided between the actuator layer and the inertial mass layer, the piezo actuator module further includes:

an adhesive layer that seals the open side of the housing, has a certain elastic force, and includes an adhesive component.

6. The piezo actuator module capable of haptic feedback in the wide frequency range according to claim 1, wherein the intermediate layer comprises a material selected to control a resonance frequency in a low frequency region.

7. A piezo actuator module capable of haptic feedback in a wide frequency range comprising:

an actuator layer including a piezo actuator having one surface coupled to an object to be excited and vibrating by an electric signal;

an inertial mass housing having an enclosure shape with a hollow inside to accommodate the actuator layer, that is open on one side and closed on the other side, wherein the inertial mass housing includes a sealing surface having a certain mass and in contact with the other surface of the actuator layer, and a side surface extending to one side along a circumference of the sealing surface, and the inertial mass housing supports the other surface of the actuator layer when the piezo actuator vibrates; and an intermediate layer provided between the object to be excited and the actuator layer or between the actuator layer and the inertial mass housing, and having a certain stiffness or a certain elastic force.

8. The piezo actuator module capable of haptic feedback in the wide frequency range according to claim 7, wherein in the piezo actuator module, mass of the sealing surface is selected to optimize excitation performance in a low frequency region.

9. The piezo actuator module capable of haptic feedback in the wide frequency range according to claim 7, wherein the intermediate layer comprises a material selected to control a resonance frequency in a low frequency region.

10. The piezo actuator module capable of haptic feedback in the wide frequency range according to claim 7, wherein, when the intermediate layer is provided between the actuator layer and the inertial mass housing, the piezo actuator module further includes:

an adhesive layer that seals the open side of the housing, has a certain elastic force, and includes an adhesive component.

* * * * *